Oct. 26, 1948.  R. E. PETERSON  2,452,068
SOUND PICKUP DEVICE

Filed Jan. 23, 1943  4 Sheets-Sheet 1

INVENTOR.
ROBERT E. PETERSON
BY
Ezekiel Wolf
ATTORNEY

Oct. 26, 1948.  R. E. PETERSON  2,452,068
SOUND PICKUP DEVICE
Filed Jan. 23, 1943  4 Sheets-Sheet 2

INVENTOR.
ROBERT E. PETERSON
BY
ATTORNEY

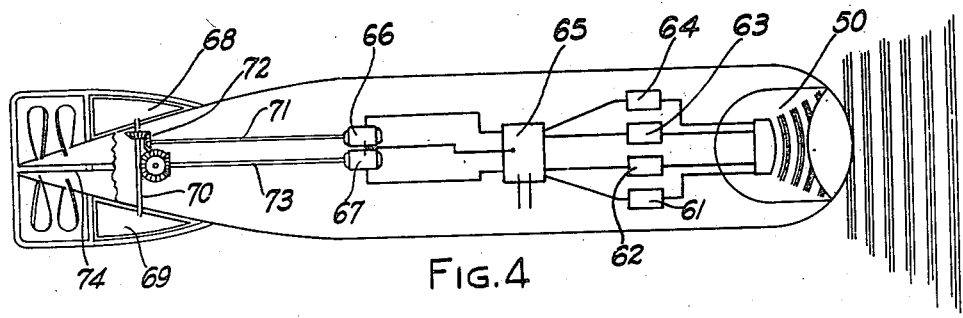
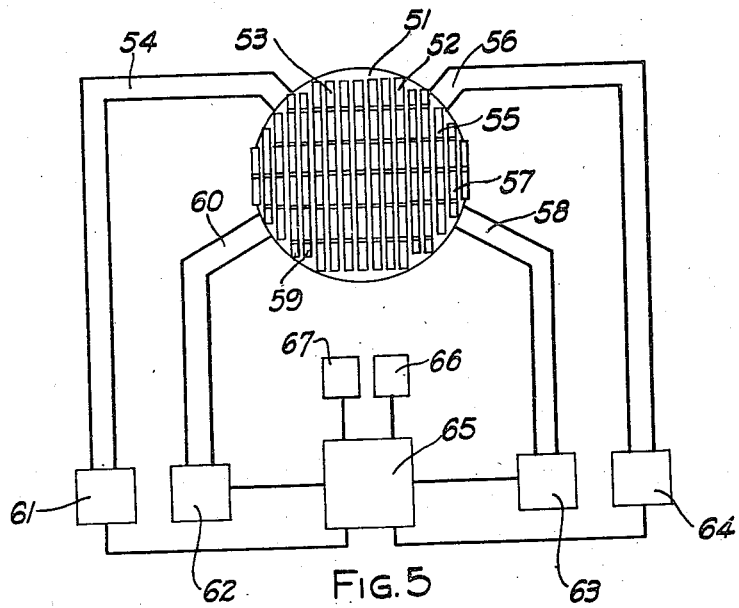
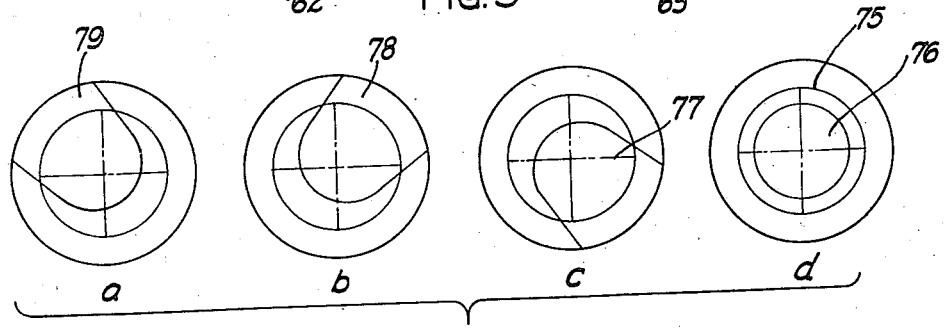

Patented Oct. 26, 1948

2,452,068

UNITED STATES PATENT OFFICE 2,452,068

SOUND PICKUP DEVICE

Robert E. Peterson, Danvers, Mass., assignor, by mesne assignments, to Submarine Signal Company, Boston, Mass., a corporation of Delaware Application January 23, 1943, Serial No. 473,415

7 Claims. (Cl. 177—386)

The present invention relates to the art of submarine signaling using compressional wave directive receiving and transmission units and more particularly relates to the detection of the direction of a source of compressional waves particularly at audible and superaudible frequencies and to their application in the control of directing the course of bodies incorporating such directive receiving units.

In the art of receiving compressional wave energy for the purpose of determining the direction of a compressional wave source a number of different systems have generally been employed. These include multispot systems having compensating elements, systems which are inherently made directive on principles relating to wave motion and systems employing condensing means for the purpose of condensing the compressional waves.

The present invention is more particularly related to the last system and uses a condensing lens carried by a rotatable housing in which the transducing elements are positioned. The device as a whole may be used for detecting the direction of a sound source and may be rotated about a vertical axis and also oscillated with respect to the horizontal axis in detecting and following the source of sound from an unknown vessel as, for instances, a hostile submarine.

Figure 1:
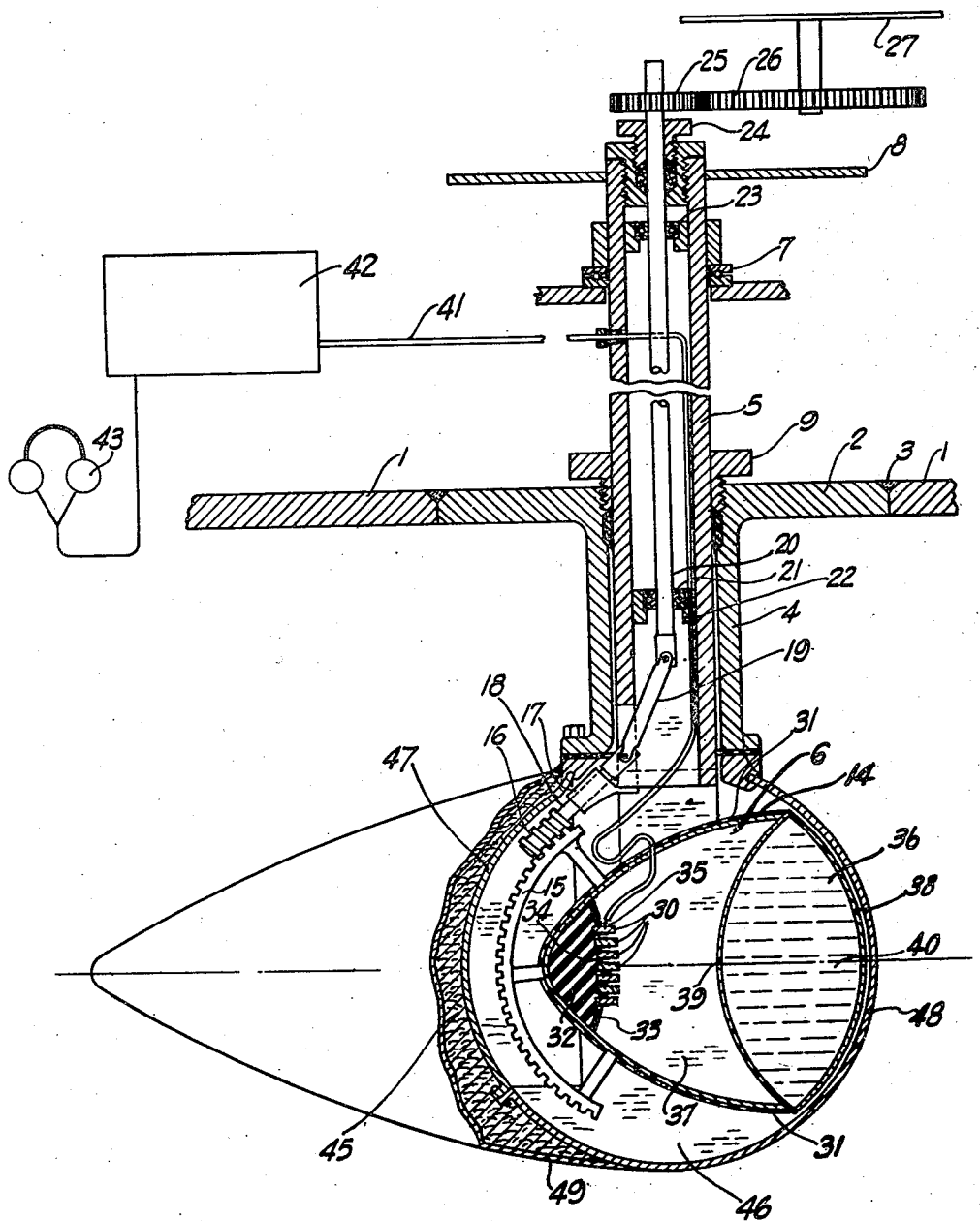
Figure 2:
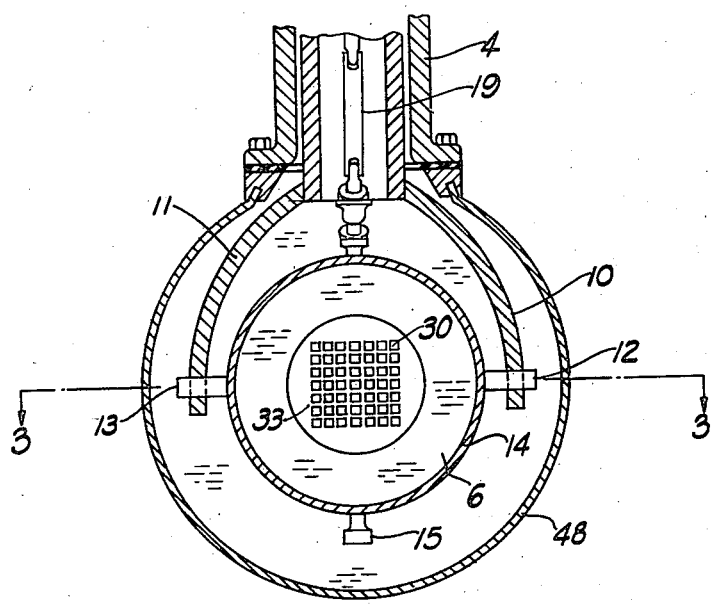
Figure 3:
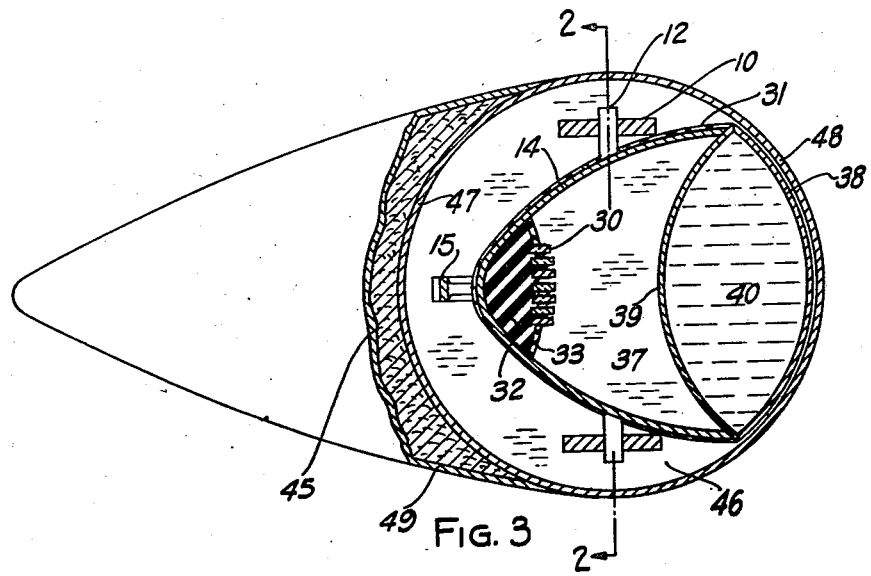
Figure 7:
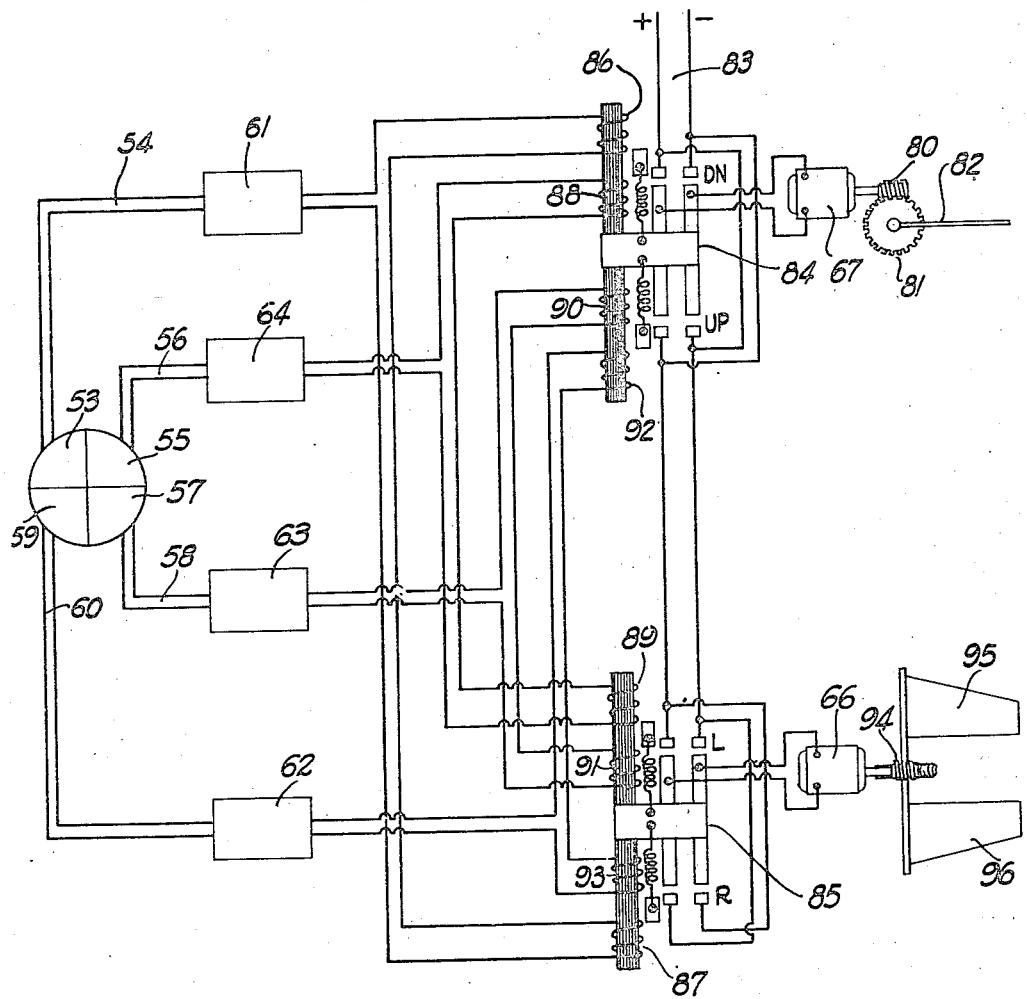

The objects and features of the present invention reside in the combination and arrangement of elements and parts and in their specific applications as will be more fully set forth and explained in connection with the rest of the specification below when read in connection with the drawings illustrating an embodiment of the invention in which Fig. 1 shows a central elevation of the invention as applied to a detector of compressional waves for determining their direction; Fig. 2 shows a partial section taken at right angles to the section of Fig. 1; Fig. 3 shows a plan sectional view of the same device; Fig. 4 shows the directive pickup unit of Fig. 1 as applied to the control of a moving torpedo or other moving object; Fig. 5 shows a schematic wiring diagram of the elements of Fig. 4; Fig. 6, a, b, c and d illustrate different positions of the sound control beam on the pickup unit; and Fig. 7 is a schematic wiring diagram showing the electrical control and operating system for producing the desired direction of motion of the moving object.

In the arrangement shown in Figs. 1, 2 and 3 the device indicated may project through a supporting wall 1 which may be the skin of a vessel or a rail flange, in which case the device may be lowered over the side of a vessel. If the device is permanently installed, it may be supported by a flange 2 which is welded as indicated at 3 to the wall 1. The flange 2, as indicated in Fig. 1, supports a sleeve 4 at right angles to it, which encases the hollow shaft 5, carrying at its lower end the rotatable pickup unit 6 which will be described later.

The hollow shaft 5 may be rotated about a vertical axis and for this purpose is supported by a thrust bearing through the ball-bearing support 7. The shaft 5 may be rotated by a motor gear drive not shown in the drawing, and its position may be indicated by a bearing scale 8 mounted at the top of the shaft. A proper stuffing box 9 may be provided between the sleeve 4 and the shaft 5 since the device may project into the water in such a way that the flange 2 may be below the water level.

The shaft 5, as indicated more clearly in Fig. 2, is provided at its lower end with two forked supports 10 and 11 projecting outwards into an arc having journaled near its ends two supporting shafts 12 and 13 supporting the pickup unit 6. The pickup unit 6 is provided with a housing or shell 14 at the back of which is mounted a sector gear 15 fixed to the housing 14. This sector gear 15 meshes with a worm gear 16 journaled in a sleeve 17 supported by the shaft 5. The shaft 18 carrying the worm gear 16 is connected at its other end to a link 19. The link 19 is connected to the shaft 20 located in the axis of the hollow cylindrical shaft 5. The joint of the link 19 is a pivoted joint permitting sufficient freedom of motion so that the link 19 may turn and also the shaft 18 when the shaft 20 is rotated. The shaft 20 is centrally supported by the ball bearings 21 mounted in the supporting holder 22 fixed within the shaft 5. A second ball-bearing support 23 may be provided at the upper end of the shaft 20 and since water may enter the space within the cylinder 5, the end of the cylinder 5 is sealed off around the shaft 20 by means of a proper watertight gland 24. The shaft 20 may be turned from its upper end through the gears 25 and 26, the indicator 27 indicating the angle of dip which the pickup unit has with the horizontal plane. The pickup unit itself is mounted within the casing 14 which should be of such a curvature as not to interfere with the collecting of the sound rays by the transducer elements 30. This casing may be spherical in shape at the front close to the outer spherical shell 48 forming an enclosing chamber with the back part 41 of the spherical shell. This shell 47, 48 may be filled with water or other suitable medium. For this purpose the casing may be parabolic in shape and may be lined on the outside with a cork acoustic-reflecting layer 31. The transducer elements 30 which may be, and preferably are, Rochelle salt crystal elements are mounted on a supporting block 32 filling out the end of the housing 14. This block 32 may be made of metal and may be shielded around its side by acoustic insulating means as indicated by the covering element 33. The crystals 30 may be set solidly within grooves 34 of the block in which they are cemented in place. The crystals preferably are of the type such that a compressional wave acting on the end surfaces will produce electrical potential across the opposed electrodes 35. The crystals 30, as indicated in Fig. 2, while spaced from each other, cover in a mosaic-like pattern the greater part of the surface of the block 32. In Fig. 2 the crystals are shown arranged in substantially a square but they may also fill out to a greater extent the entire circularly bound surfaces of the block 32. The space within the casing 14 between the sound lens 36 and the transducing elements 30 may be filled with an acoustic conducting liquid 37, some suitable oil, for instance, having different acoustic characteristics than the sound lens. The sound lens 36 is bounded by two convex surfaces 38 and 39. The liquid 40, which may be ether or some other suitable liquid, within the lens has such acoustic properties that its velocity is less than that in the surrounding medium to the extent that sound passing through it will be converged towards the focal plane in which the transducing units effectively act. With a substantially arcuate curved surface the transducing elements 30 will lie in curved planes somewhat as shown in the drawing, depending upon the liquid in the lens, the shape and other factors. By proper adjustment of the curvature of the surfaces 38 and 39 of the lens shells and the effective curved surface of the transducing elements it is possible to make all the transducing units of the element 30 act in the same phase and with substantially the same amplitudes.

To the rear of the casing 47, 48 holding the sound lens casing and the operating mechanism therefor, there is provided a shell 49 which tapers from the spherical shell 47, 48 substantially in a conical form to form a streamlined body to reduce water turbulence when the vessel is in motion. This body may be filled with a sound insulating medium 45 so that no sound from the rear approaches the lens casing while the space within the casing 47, 48 may be filled with a sound conducting medium 46.

The advantage of such an arrangement is that with a comparatively small sound lens of twelve inches or less in diameter it is possible to determine the direction of the sound source not only with very high accuracy, but it is also possible to provide a receiving unit of very great sensitivity and one which is free from foreign disturbances in the vicinity of the pickup unit. The device is particularly useful for listening to the acoustic components.

In the operation of the device in a sound-propagating medium as, for instance, sea water, the sound unit within the fixed casing may be rotated about a vertical axis by turning the shaft 5. The directive qualities of the sound unit are such that the direction of the sound wave may be determined with great accuracy. At the same time that the unit may be rotated about a vertical axis, it may also be tilted up or down about a horizontal axis, thus enabling it to pick up sounds coming from a submarine beneath the water surface. The energy picked up by the pickup elements 30 is conducted over the cable 41 to the amplifier 42 the output of which may be connected to a pair of head phones 43 or some other audible or visible indicator indicating the sounds picked up by the pickup unit.

In the arrangement indicated in Figs. 4, 5, 6 and 7 the pickup unit and lens 50 is mounted in the head of a torpedo in such a manner that the torpedo may be guided in accordance with the sound which it receives. In this device the Rochelle-salt crystal receivers 52 are mounted on a plate 51 whose surface is curved to conform to the shape of the wave front normally impinging upon it, that is, when the sound is approaching in the direction of the axis of the lens. A great many of the Rochelle salt crystal units may be used, and these, as indicated in Fig. 1, may be mounted with their compressional axes parallel to the axis of the lens on the comparatively rigid surface of the element 51. In this case the electrodes are positioned on the sides of the crystals perpendicular to the short dimension of axis of the crystal. The pickup unit 50, with the crystals 52 mounted in it, is divided into four sections as indicated in Fig. 5, section 53 being connected to the line 54, section 55 being connected to the line 56, section 57 being connected to the line 58 and section 59 being connected to the line 60. Each of these sections controls rudder elements to produce the desired course correction. The two upper sections 53 and 55 as compared to the two lower sections 57 and 59 control respectively the up and down motion of the torpedo while the right and left sections 55 and 57, on the one hand, and 53 and 59, on the other hand, control the left and right directions of the torpedo. For this purpose each section is fed to an amplifier 61, 62, 63, 64 and the outputs of the amplifiers go to a discriminator which furnishes the control for operating at the proper instances the up-down mechanism 66 and the right-left mechanism 67. As indicated somewhat diagrammatically in Fig. 4, the discriminator 65 controls the operations of the motors 66 and 67, the motor 66 producing the right and left control by directing the rudder fins 68 and 69 pivoted to the shaft 70 and driven by the motor 66 through the shaft 71 and the gears 72. The motor 67 may drive the shaft 73 and in a similar fashion control the horizontal rudders 74 for the up-down motion of the vessel.

In Fig. 6 there is an indication of the manner in which the sound image may act upon the pickup area. Looking at the diagram d first, it will be noted that the pickup area is indicated by the circle 75 and that the sound image is indicated by the ring 76. If this image 76 drops towards the lower right as indicated by the image 77 in Fig. c, then it may be assumed that the sound is now coming from the upper left and correction therefore will be made to elevate the vessel and direct it towards the upper left to bring the image back to the center as indicated in Fig. d. In Fig. b the image 78 is received in the upper right indicating that the direction of the torpedo will be changed to the lower left and similarly in Fig. a with the image 79 in the upper left the change will be to the lower right.

The operating mechanism for the system shown in Figs. 4 and 5 is shown more completely in Fig. 7. Here the motor 67 is indicated as driving through a worm 80 a gear 81 which sets the up-and-down rudder numbered 82 in this arrangement. The up-and-down motor 67 is a motor of the reversible type and is supplied through the line 83 by means of a switch 84 of a double-pole, double-throw type such that in one direction the motor is driven clockwise and in the other direction driven counterclockwise. Each of the four pickup sectors 53, 55, 57 and 59 is connected through their respective amplifiers 61, 64, 63 and 62 to the two solenoid switches 84 and 85, the amplifier 61 through the coils 86 and 87 connected in series, the amplifier 64 through the coils 88 and 89 connected in series, the amplifier 63 through the coils 90 and 91 connected in series and the amplifier 62 through the coils 92 and 93 connected in series. When the amplifier 61 operates, the image will be in the upper left sector indicating that the sound is coming from the lower right sector so that the coil 86 operates to make the vessel go down and the coil 87 operates to make the vessel go to the right. It should be noted that the motor 66 corresponding to the same numbered element in Fig. 4 drives through a worm gear 94 the right and left rudders 95 and 96. The amplifier 64 acts in the same direction as the amplifier 61 for the up-and-down rudder and therefore the coil 88 is connected to aid the coil 86, while the coil 89 is connected in opposing relation to the coil 87. The amplifier 63 is connected in aiding relation with an amplifier 64 as far as the right-and-left rudders is concerned and therefore the coil 91 and the coil 89 work together on the right and left switch whereas these two amplifiers work in opposition on the up-and-down switch as indicated by the position of the coils 88 and 90 on the up-and-down switch. The connection of the amplifier 62, it will be noted, follows the above analysis working in conjunction with 61 on the left-and-right rudder and in opposition to it on the up-and-down rudder.

When the image 76, as indicated in Fig. 6, is in a central position, the amplifiers will be equally excited and the rudders will hold a neutral course. However, if the image should shift over the face of the pickup element, then the mechanism will operate to bring the image back to its central position. In this setup the torpedo or vessel will drive in the direction of the sound source and if the torpedo acoustic element 50 is set to pick up and receive sounds from any enemy vessel, it will tend to follow the direction from which these sounds came to the source.

By making the head directional, that is so that it will not receive sounds except those approaching from a given direction, the torpedo when once on its general course in the direction of the source of the enemy's vessel, will not be diverted from it unless another vessel comes within the same sound focus and is more powerful in sound emission than the original attracting vessel.

The switching arrangement indicated in Fig. 7 is somewhat diagrammatical inasmuch as any type of control switch may be used in which the elements may be combined for controlling the motor operation in the manner described in connection with Fig. 7. Instead of using a solenoid switch for this purpose, an ordinary magnetic switch may be used in which the coils act together and in opposition in accordance with their position with reference to the armature of the magnet. The polaroid magnetic switch may be used in which right and left rudders are balanced against each other and the same type of switch may also be used for balancing the up-and-down rudder coils. Instead of using Rochelle salt crystal elements as receiving units, a plurality of magnetostrictive elements may also be used, each acting as a pickup unit for the sound waves and the sectors acting together similarly as described in connection with Fig. 5 of the application.

Having now described my invention, I claim:

1. A sound pickup device comprising a casing having a sound lens at one side thereof, a substantially rigid member positioned in another part of the casing extending over the focal surface of the lens and a plurality of pickup elements mounted on said rigid surface adapted to receive sound waves arriving substantially in the same phase at said focal surface, said pickup elements comprising a plurality of Rochelle salt crystals mounted with one compressional surface on said rigid element and a sound propagating medium within said casing to which the other compressional surfaces of said crystals are exposed.

2. A sound pickup device comprising a casing having a sound lens positioned in the opening thereof, a pickup unit composed of a plurality of piezoelectric crystal elements arranged closely adjacent one another covering a substantial surface each having one of its compressional surfaces only mounted in the focal surface of said lens.

3. A sound pickup device comprising an outer shell adapted to be immersed in a sound-propagating medium, said shell having a streamlined contour with a rear portion not substantially exposed to the sound propagating medium and a front arcuate surface adapted to act as a window for a sound lens, a sound-lens unit comprising a casing having a sound lens at one face thereof, said lens having a surface contour of a similar shape to that of the outer shall and positioned with its outer surface closely adjacent thereto, said lens being convex, and piezoelectric means contained within said lens unit positioned in and extending over a substantial surface of the focal plane thereof for translating compressional wave energy to electrical energy, or vice versa.

4. A sound pickup device comprising an outer shell having a front surface substantially spherical in shape and a rear tapered member forming a substantially streamlined housing, an inner housing positioned within said shell with a portion thereof substantially spherical, a sound unit mounted within said inner housing facing said spherical portion thereof, means pivotally supporting said inner housing on a horizontal axis and means supporting said horizontal axis in a rotatable vertical axis whereby said sound unit within the inner housing may be rotated about axes at right angles with each other, said inner housing having formed in its spherical portion a convex lens positioned directly in front of said sound unit, said unit having a pickup element extending substantially over the focal plane of said lens.

5. A sound pickup device comprising an outer shell having a front surface substantially spherical in shape and a rear tapered member forming a substantially streamlined housing, an inner housing positioned within said shell with a portion thereof substantially spherical, a sound unit mounted within said inner housing facing said spherical portion thereof, means pivotally supporting said inner housing on a horizontal axis and means supporting said horizontal axis in a rotatable vertical axis whereby said sound unit within the inner housing may be rotated about axes at right angles with each other, said inner housing having formed in its spherical portion a convex lens positioned directly in front of said sound unit, said unit having a pickup element extending substantially over the focal plane of said lens, and means adapted for turning said unit about its horizontal and vertical axes, one independent of the other.

6. A sound pickup device comprising an outer shell having a front portion thereof forming a substantially spherical surface, said shell being tapered off at the rear forming as a whole a streamlined element, a sound pickup unit, means for rotating said sound pickup unit in back of the spherical portion of the shell and closely positioned thereto, said pickup unit having a sound lens with its outer surface adjacent the inner spherical surface of said shell and having substantially the same shape as said shell, a casing enclosing said lens with a Rochelle salt pickup element positioned in the focal surface of said lens, said lens being convex, and means filling the space between the lens and the pickup element adapted to act as a sound-propagating medium.

7. A sound pickup device adapted to be immersed in a sound propagating medium comprising an outer shell having a front portion thereof forming a substantially spherical surface, said shell being tapered off at the rear forming as a whole a streamlined element, a sound pickup unit, means for rotating said sound pickup unit in back of the spherical portion of the shell and closely positioned thereto, said pickup unit having a sound lens with its outer surface adjacent the inner spherical surface of said shell and having substantially the same shape as said shell, a casing enclosing said lens with a Rochelle salt pickup element positioned in the focal surface of said lens, said lens being convex, and means filling the space between the lens and the pickup element adapted to act as a sound propagating medium, said sound lens comprising two outwardly convex shells with a sound propagating medium contained therebetween having a lower sound velocity than the medium in which the device is adapted to be immersed.

ROBERT E. PETERSON.

REFERENCES CITED

The following references are of record in the file of this patent:

UNITED STATES PATENTS

| Number | Name | Date |
| --- | --- | --- |
| 1,121,563 | Leon | Dec. 15, 1914 |
| 1,137,222 | Leon | Apr. 27, 1915 |
| 1,471,547 | Chilowsky et al. | Oct. 23, 1923 |
| 1,472,558 | Fessenden et al. | Oct. 30, 1923 |
| 2,138,036 | Kunze | Nov. 29, 1938 |
| 2,166,162 | Kunze | July 18, 1939 |
| 2,181,132 | Kallmeyer | Nov. 28, 1939 |
| 2,216,949 | Kellogg | Oct. 8, 1940 |
| 2,283,285 | Pohlman | May 19, 1942 |

FOREIGN PATENTS

| Number | Country | Date |
| --- | --- | --- |
| 279,878 | Great Britain | Mar. 8, 1928 |
| 297,996 | Germany | Aug. 27, 1919 |
| 546,202 | Great Britain | July 2, 1942 |